(12) United States Patent
Hori et al.

(10) Patent No.: US 8,350,434 B2
(45) Date of Patent: Jan. 8, 2013

(54) PERMANENT MAGNET TYPE ROTARY ELECTRIC MACHINE

(75) Inventors: Masahiro Hori, Hitachi (JP); Daisuke Kori, Hitachinaka (JP); Akiyoshi Komura, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 312 days.

(21) Appl. No.: 12/681,040

(22) PCT Filed: Feb. 27, 2009

(86) PCT No.: PCT/JP2009/000883
§ 371 (c)(1),
(2), (4) Date: Mar. 31, 2010

(87) PCT Pub. No.: WO2010/097838
PCT Pub. Date: Sep. 2, 2010

(65) Prior Publication Data
US 2011/0260466 A1  Oct. 27, 2011

(51) Int. Cl.
*H02K 1/27* (2006.01)
*H02K 21/14* (2006.01)
(52) U.S. Cl. ......... 310/156.53; 310/156.56; 310/156.57; 310/216.069; 310/216.072; 310/216.073
(58) Field of Classification Search .............. 310/156.53 –156.57, 156.01, 216.069–216.073
See application file for complete search history.

(56) References Cited

U.S. PATENT DOCUMENTS

| 7,994,666 B2 * | 8/2011 | Kori et al. .................. 310/61 |
| 2008/0129129 A1 | 6/2008 | Kori et al. |

FOREIGN PATENT DOCUMENTS

| CN | 10 1188369 | 5/2008 |
| EP | 1926196 A2 | 5/2008 |
| JP | 2000-166140 | 6/2000 |
| JP | 2008-131813 | 6/2008 |
| KR | 2008 0047300 | 5/2008 |
| WO | 2010 097838 | 9/2010 |

* cited by examiner

*Primary Examiner* — Quyen Leung
*Assistant Examiner* — Leda Pham
(74) *Attorney, Agent, or Firm* — Brundidge & Stanger, P.C.

(57) ABSTRACT

For providing a permanent magnet type rotary electric machine that can reduce magnetic fluxes concentrated to one side in rotating direction on a magnetic pole circumferential face that causes torque ripple as well as ensure the mechanical strength, in the present invention, an outer circumference of respective magnetic poles is formed in a circular arc having a same curvature as well as the magnetic pole center axes of the respective magnetic poles are displaced with respect to the rotation center of a rotor so that an air gap between a stator and the respective magnetic pole outer circumferences at one side in the rotating direction is widened in comparison with the air gap at the other side.

14 Claims, 8 Drawing Sheets

·········· CONVENTIONAL EXAMPLE
——— FIRST EMBODIMENT

·········· CONVENTIONAL EXAMPLE
——— MODIFICATION OF FIRST EMBODIMENT

PERMANENT MAGNET TYPE ROTARY ELECTRIC MACHINE

FIELD OF THE INVENTION

The present invention relates to a permanent magnet type rotary electric machine, and in particular, relates to a permanent magnet type rotary electric machine that is suitable for such as a generator and motor of which rotating direction is always limited in one direction.

BACKGROUND ART

These years, an employment of permanent magnet type rotary electric machines is increasing remarkably in respective fields with respect to rotary electric machines. And in order to enhance economy through increasing a single machine capacity of permanent magnet type rotary electric machine, a demand of a small size and large capacity permanent magnet type rotary electric machine is increasing. However, when reducing the size and increasing the capacity of a permanent magnet type rotary electric machine is tried, since the amount of heat generated is increased, a permanent magnet type rotary electric machine as shown in FIG. 1 in patent document 1 has been proposed in which cooling use ventilation passages are formed between respective magnetic poles.

Through forming the cooling use ventilation passages between respective magnetic poles, the amount of heat generated can be suppressed, and the size of the permanent magnet type rotary electric machine can be reduced corresponding to the suppression. However, due to the formation of the cooling use ventilation passages between respective magnetic poles, magnetic flux concentration to the respective magnetic poles becomes remarkable, which causes to increase torque ripple that leads to increase such as vibrations and noises.

In order to decrease this magnetic flux concentration to the respective magnetic poles, an air gap between the outer circumferential face of the magnetic pole and the stator is increased at both end portion sides in circumferential direction in comparison with that at the center portion of the magnetic pole as shown FIGS. 14 and 15 in the patent document 11, thereby, the magnetic flux concentration is relaxed, and the torque ripple is reduced.

Patent Document 1: JP-A-2008-131813

SUMMARY OF THE INVENTION

Tasks to be Solved by the Invention

With the permanent magnet type rotary electric machine according to patent document 1, it is possible to reduce the torque ripple.

On one hand, in a permanent magnet type rotary electric machine which rotates always only in one direction, the magnetic flux concentration to the respective magnetic poles is limited to one side in the rotating direction in comparison with a rotary electric machine that rotates in both directions.

However, for the permanent magnet type rotary electric machine which rotates always only in one direction, no technology has been proposed until now that reduces the magnetic fluxes concentrated to one side in the rotating direction on the magnetic pole circumferential face at the side including a permanent magnet (where the permanent magnet is buried). The reason of this is that in a permanent magnet type rotary electric machine, since a permanent magnet is buried near the circumferential face of magnetic pole, if the air gap is tried widened by varying the configuration of the magnetic pole circumferential face, a rotor core around a portion where the permanent magnet is buried is thinned, the mechanical strength for holding the permanent magnet against such as centrifugal force and electromagnetic force during the operation thereof may become hard to be ensured.

An object of the present invention is to provide a permanent magnet type rotary electric machine that can reduce the magnetic fluxes concentrated to one side in the rotating direction on the magnetic pole circumferential face that causes torque ripple as well as can ensure the mechanical strength.

Measure for Solving the Tasks

In order to achieve the above object, in the present invention, an outer circumference of respective magnetic poles is formed in a circular arc having a same curvature as well as the magnetic pole center axes of the respective magnetic poles are displaced with respect to the rotation center of the rotor so that the air gap between the stator and the respective magnetic pole outer circumferences at one side in the rotating direction is widened in comparison with the air gap at the other side.

As in the above manner, through forming the outer circumference of respective magnetic poles in a circular arc having a same curvature as well as through displacing the magnetic pole center axes of the respective magnetic poles with respect to the rotation center of the rotor, the rotor core around a portion where the permanent magnet is buried need not be thinned, thereby, the mechanical strength for holding the permanent magnets against such as centrifugal force and electromagnetic force during the operation can be ensured as well as since the air gap between the stator and the respective magnetic pole outer circumferences at one side in the rotating direction is widened in comparison with the air gap at the other side, the magnetic flux concentration can be relaxed.

Advantages of the Invention

As has been explained above, according to the present invention, a permanent magnet type rotary electric machine can be obtained that can reduce the magnetic fluxes concentrated to one side in the rotating direction on the magnetic pole circumferential face that causes torque ripple as well as can ensure the mechanical strength.

EMBODIMENTS FOR CARRYING OUT THE INVENTION

Figure 1:
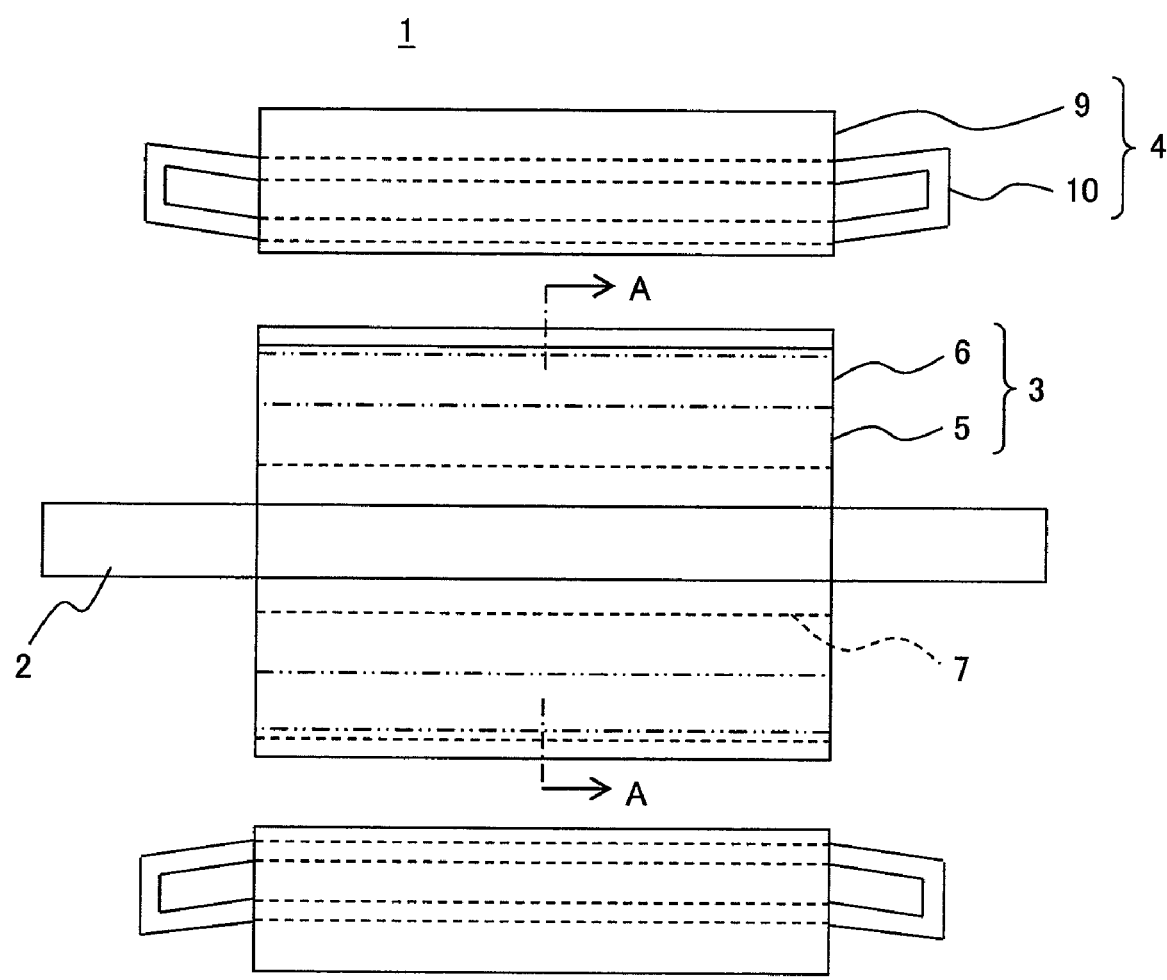
FIG. 1 is a schematic vertical cross sectional view of a permanent magnet type generator showing a first embodiment of permanent magnet type rotary electric machines according to the present invention.
Figure 2:
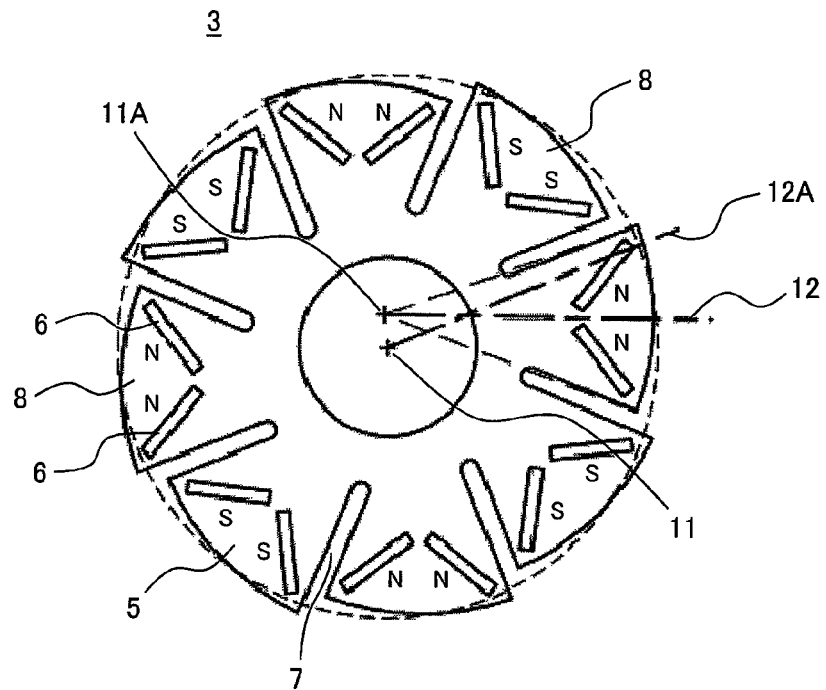
FIG. 2 is an enlarged vertical cross sectional view of the rotor taken along the A-A line in FIG. 1.
Figure 3:
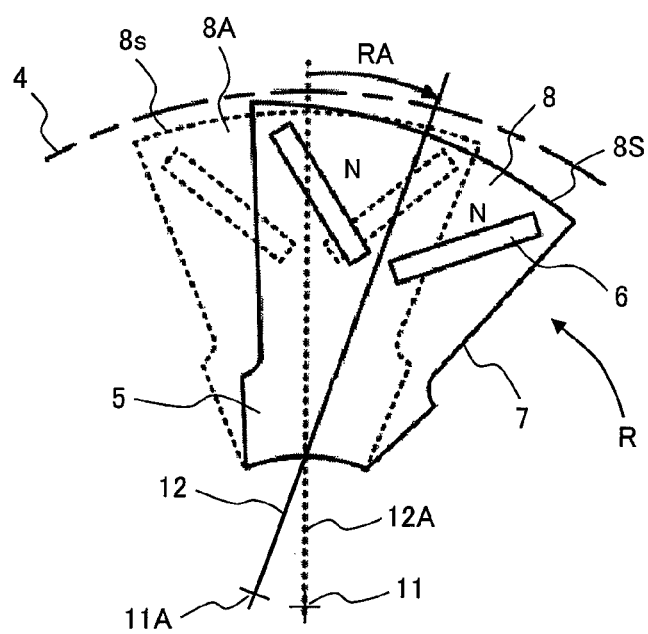
FIG. 3 is an enlarged view of the magnetic pole in the rotor as shown in FIG. 2.

Herein below, a first embodiment of permanent magnet type rotary electric machines according to the present invention will be explained with reference to a permanent magnet type generator as shown in FIG. 1 through FIG. 3.

The permanent magnet type generator 1 is provided with a rotating shaft 2 coupled to a prime mover and born in rotation free, a rotor 3 fixed to the rotating shaft 2 and a stator 4 arranged around the circumference of the rotor 3 via an air gap.

The rotor 3 includes a rotor core 5 that is constituted by laminating electromagnetic plates in the axial direction and permanent magnets 6 that are buried at the outer circumferential side of the rotor core 5 and cooling use ventilation grooves 7 that are formed in the rotor core 5 extending in axial direction in an even number along the circumferential direction with a predetermined interval space. The permanent magnets 6 are buried at the outer circumferential side of the rotor core 5 between adjacent cooling use ventilation grooves 7 along circumferential direction, and constitute magnetic poles of an even number.

On one hand, the stator 4 includes a stator core 9 that is disposed with respect to the rotor core 5 via an air gap and is constituted by laminating electromagnetic plates in the axial direction and stator windings 10 that are mounted in winding slots (not shown) in axial direction formed on the inner diameter side of the stator core 9.

And, the magnetic pole 8 is formed, as shown by broken lines in FIG. 3, in such a manner that a magnetic pole center axis 12A of a magnetic pole 8A having outer circumference 8s with a uniform air gap with respect to the stator 4 that is formed with a curvature (radius) with reference to the rotation center 11 of the rotor 3 is moved to a position where the same is displaced in a slanted manner to the opposite direction RA from the rotating direction R with reference to the inner diameter side of the rotor care 5, in other words, the magnetic pole center axis 12 is moved to a position where the magnetic pole center axis 12A is displaced with respect to the rotation center 11.

By forming the magnetic pole 8 in the above manner, the air gaps between the outer circumference 8S and the stator 4 are widened at the opposite side from the rotating direction R, and gradually decrease toward the side in the rotating direction R.

Accordingly, the magnetic fluxes concentrated to the opposite side from the rotating direction R of the respective magnetic poles 8 can be relaxed by means of the widened air gap, as a result, the torque ripple due to the magnetic flux concentration can be reduced.

Figure 4:
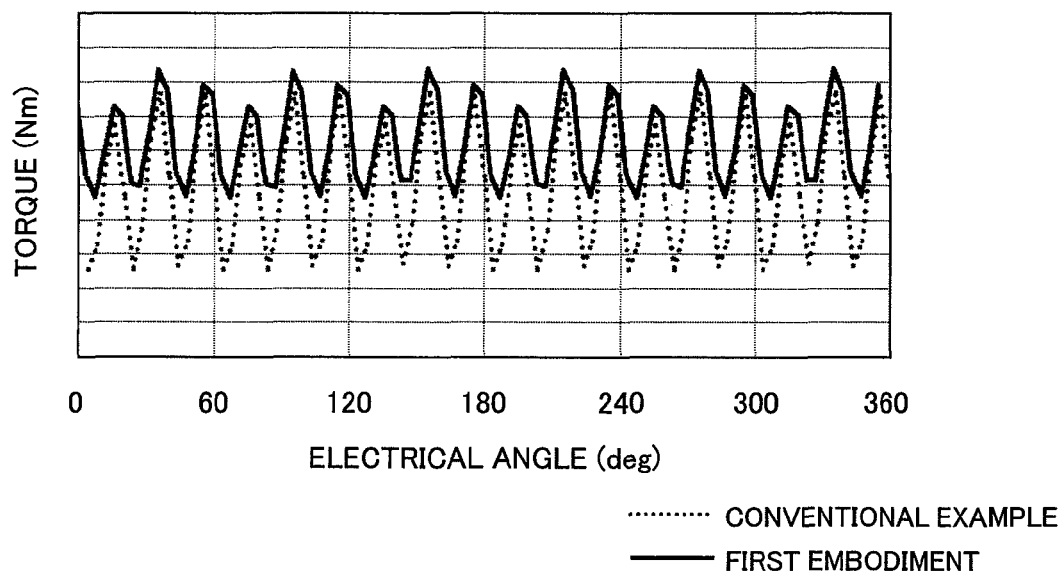
FIG. 4 is a torque waveform diagram of the permanent magnet type generator according to the first embodiment.

Incidentally, when torque ripples are measured with respect to the magnetic poles 8A (a conventional example) having configuration as shown by broken lines in FIG. 3 and the magnetic poles 8 according to the present embodiment having the configuration formed by displacing as shown by the solid lines in FIG. 3, it was confirmed as shown by the torque waveforms in FIG. 4 that the torque ripple according to the present embodiment is reduced by about 30% in comparison with that of the conventional example.

Further, even when the magnetic poles 8 is constituted by displacing the magnetic pole center axis 12, there appears no variation in thickness of the rotor core 5 around the portions where the permanent magnets 6 are buried in the rotor 3, accordingly, no mechanical strength reduction of the rotor core 5 holding the permanent magnets 6 is observed, and the permanent magnets 6 can be held stably.

Other than the above, since the cooling use ventilation grooves 7 are formed between respective adjacent poles 8, when cooling medium (such as air circulating inside the machine and outer air introduced from outside of the machine) is caused to flow in these cooling use ventilation grooves during operation, the degree of heating of the permanent magnet type generator 1 can be suppressed, and the size of the permanent magnet type generator 1 can be reduced correspondingly.

Figure 5:
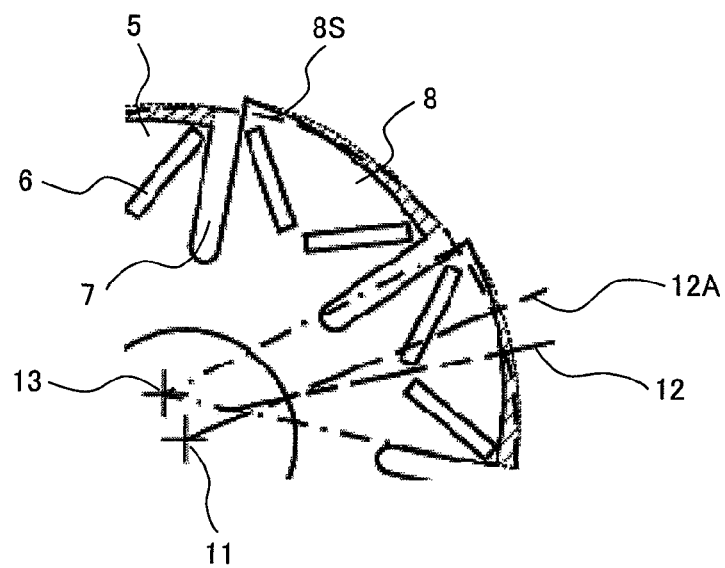
FIG. 5 is a partial front view of a rotor showing a modification of the first embodiment.

Now, in the present embodiment, although the air gaps between the outer circumference 8S for the magnetic pole 8 and the stator 4 are varied by displacing the magnetic pole center axis 12 in a slanted manner, as in a modification as shown in FIG. 5, the air gaps can be varied by displacing the radius center 13 of the outer circumference 8S for the magnetic pole 8 from the magnetic pole center axis 12 of the rotor 3.

Figure 6:
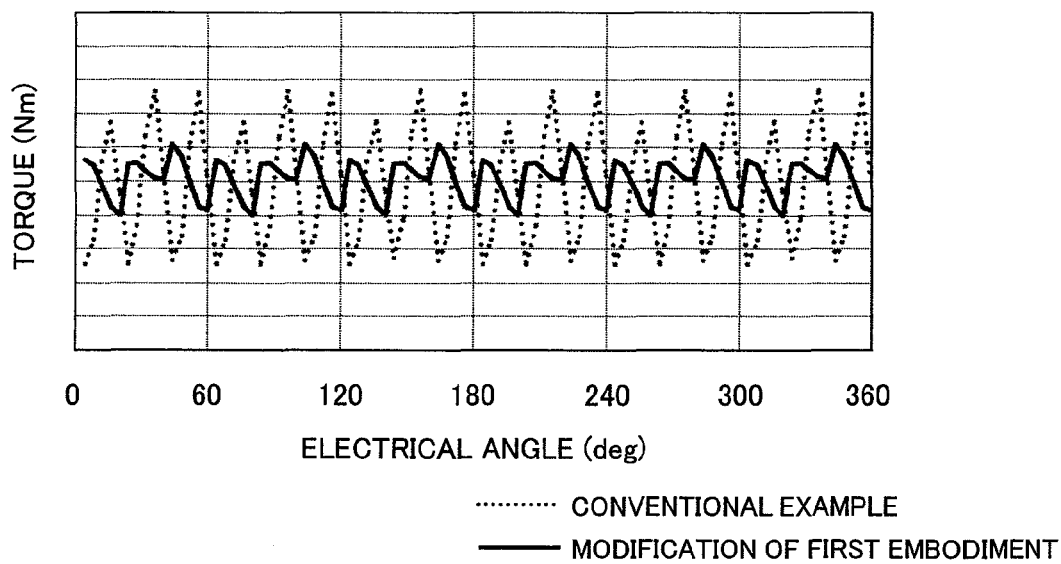
FIG. 6 is a torque waveform diagram of the permanent magnet type generator according to the modification of the first embodiment.

By displacing the radius center 13 of the outer circumference 8S for the magnetic pole 8 of the rotor 3, the air gaps with respect to the stator 4 at the side opposite to the rotating direction can be further widened, the magnetic flux concentration can be efficiently reduced. As a result, as shown in FIG. 6, the torque ripple according to the modification is reduced by about 60% in comparison with that of the conventional example.

Figure 7:
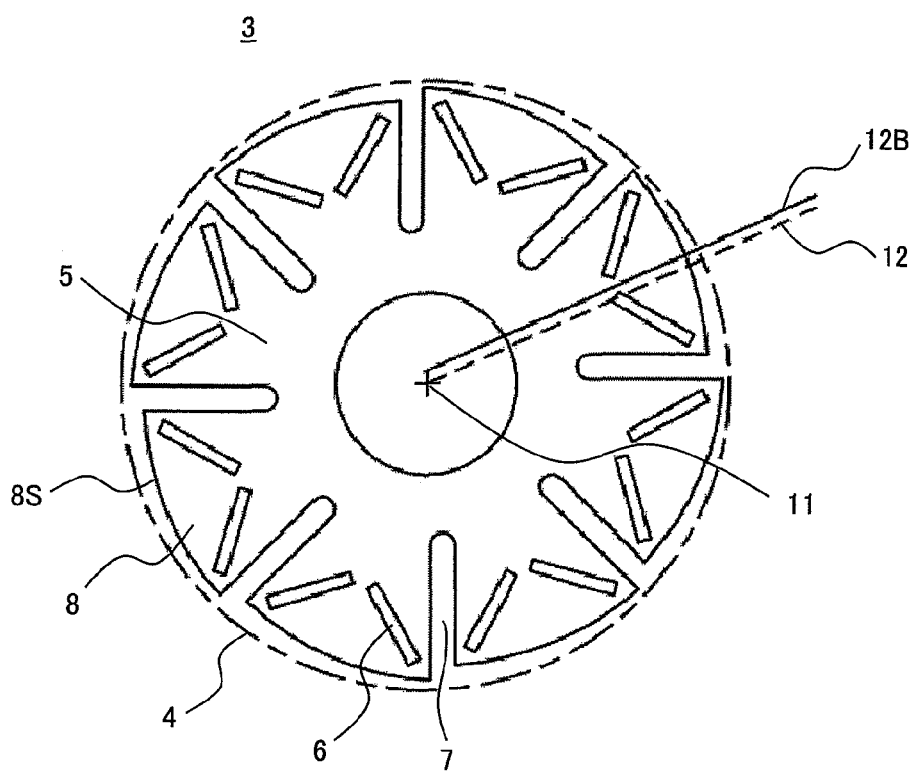
FIG. 7 is a view corresponding to FIG. 2 showing a second embodiment of permanent magnet type rotary electric machines according to the present invention.
Figure 8:
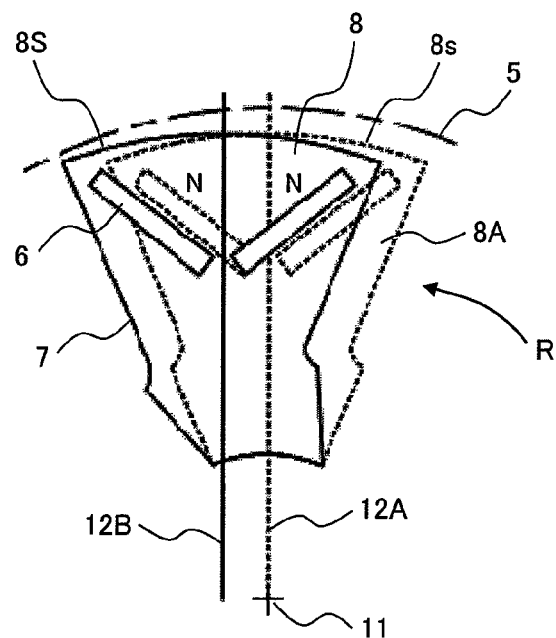
FIG. 8 is an enlarged view of the magnetic pole in the rotor as shown in FIG. 7.

Nextly, a second embodiment of the present invention will be explained with reference to FIGS. 7 and 8, wherein, since ones bearing the same reference numerals as in FIGS. 1~3 and FIG. 5 show the same constitutional members as in FIGS. 1~3 and FIG. 5, further detailed explanation thereof is omitted.

In the present embodiment, a constitution different from that of the first embodiment as shown in FIG. 1 is the method of displacing the magnetic pole center axis for the magnetic pole 8. Namely, in the present embodiment, the magnetic poles 8 is formed in such a manner that the magnetic pole center axis 12A passing through its rotation center of the magnetic pole 8A having the outer circumference 8s and having the rotation center 11 as the radius center as shown by the broken lines in FIG. 8 is moved in parallel displacement to a position defined by the magnetic pole center axis 12B while keeping the same configuration.

By constituting in such manner, the equivalent advantages as in the first embodiment can be achieved.

Further, even in the present embodiment, as shown in the modification (FIG. 5) of the first embodiment, by displacing the radius center 13 of the outer circumference 8S for the magnetic pole 8, the torque ripple can be further reduced.

Now, in the first and second embodiments, although the number of magnetic poles 8 in the rotor 3 is set as eight poles, other pole number can be used, further, even when such as number of winding slots and winding method (such as concentration windings and distribution windings) are varied, when the rotor 3 according to the above embodiments are applied, the same advantages as above can be achieved.

Figure 9:
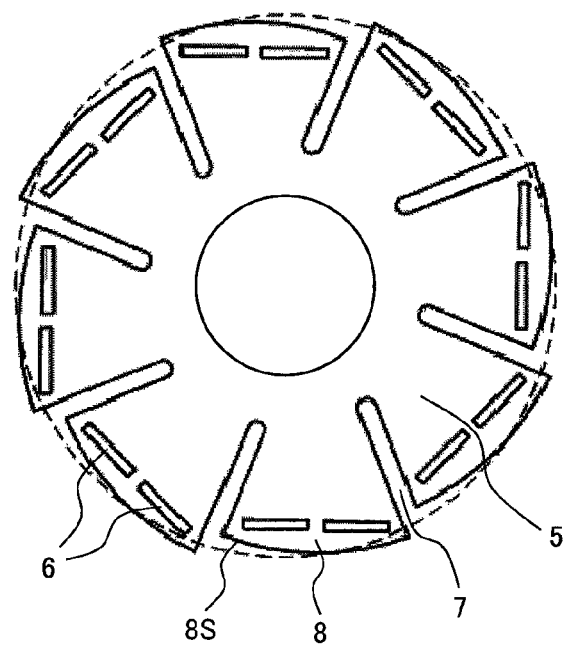
FIG. 9 is a view corresponding to FIG. 2 showing a third embodiment of permanent magnet type rotary electric machines according to the present invention.

FIG. 9 shows a third embodiment according to the present invention, and has the same constitution as that of the first and second embodiment excepting that the buried positions of the permanent magnets 6 in the rotor core 5 is differentiated.

Namely, in the first and second embodiments, two permanent magnets 6 of flat plate having a rectangular cross section are used, and buried in a V shape for every magnetic pole. However, in the present embodiment, two permanent magnets of flat shape are buried in parallel so that their plate faces align.

Even with the present embodiment, the equivalent advantages as in the above embodiments can be achieved.

Figure 10:
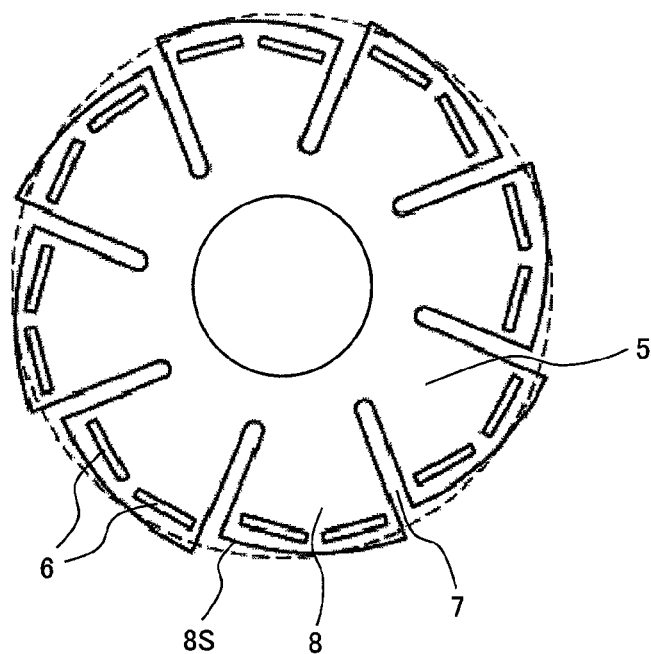
FIG. 10 is a front view of a rotor showing a first modification of the third embodiment.

Further, FIG. 10 is a first modification of the third embodiment, wherein two permanent magnets 6 of flat plate are used and buried in an inverted V shape for every magnetic pole.

Figure 11:
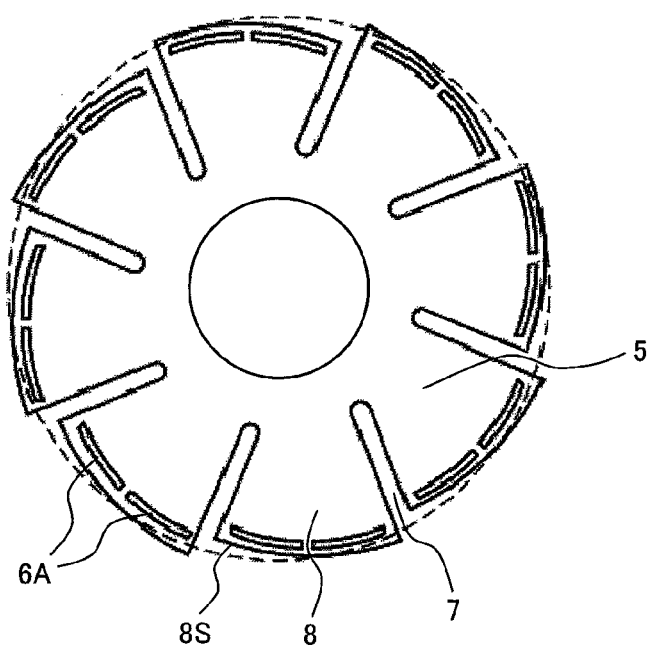
FIG. 11 is a front view of a rotor showing a second modification of the third embodiment.

FIG. 11 is a second modification of the third embodiment, wherein two permanent magnets 6A formed in a circular arc shape are used and buried so that the circular arcs run along the outer circumference 8S for every magnetic pole.

As shown in the above third embodiment and two modifications thereof, by selecting the burying method of the permanent magnets 6 and 6A depending on the formation conditions of the outer circumference 8S of the magnetic poles 8, the thickness of the rotor core 5 near the permanent magnets 6 and 6A can be ensured so that the mechanical strength thereof can also be ensured.

Figure 12:
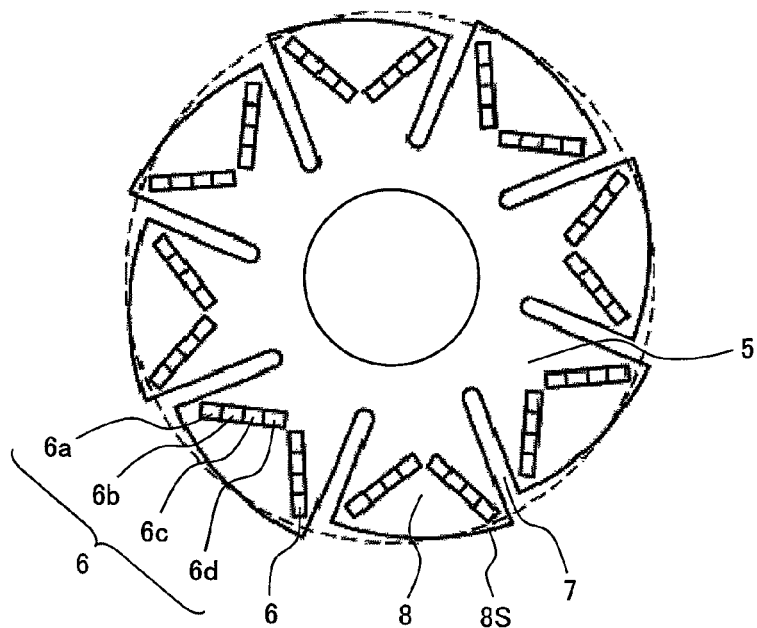
FIG. 12 is a view corresponding to FIG. 2 showing a fourth embodiment of permanent magnet type rotary electric machines according to the present invention.

FIG. 12 shows a fourth embodiment according to the present invention, wherein each of the permanent magnets 6 buried in the rotor core 5 is constituted by dividing the same in plural in its width direction such as permanent magnet pieces 6a, 6b, 6c and 6d.

When the permanent magnet 6 is constituted from the permanent magnets pieces 6a, 6b, 6c and 6d, heating of the permanent magnets 6 due to eddy current loss can be suppressed low, which contributes to reduce size and increase capacity of the permanent magnet type generator.

Further, the division of the permanent magnet 6 into pieces is not limited to the present embodiment, but is of course applicable to the permanent magnets 6 and 6A in the other embodiments and modifications.

In the respective explanations as above, although the respective cooling use ventilation grooves 7 are provided so as to form the magnetic poles 6, and the rotor 3 is cooled thereby, sometimes the rotor 3 is required to be cooled further. In such instance, as in a fifth embodiment as shown in FIG. 13, when through holes 14 serving as axial direction cooling passages are formed for every magnetic pole 6 in axial direction at the inner diameter side from the portions where the permanent magnets 6 are buried, and coolant is flowed therethrough, cooling capacity thereof can be enhanced.

Figure 14:
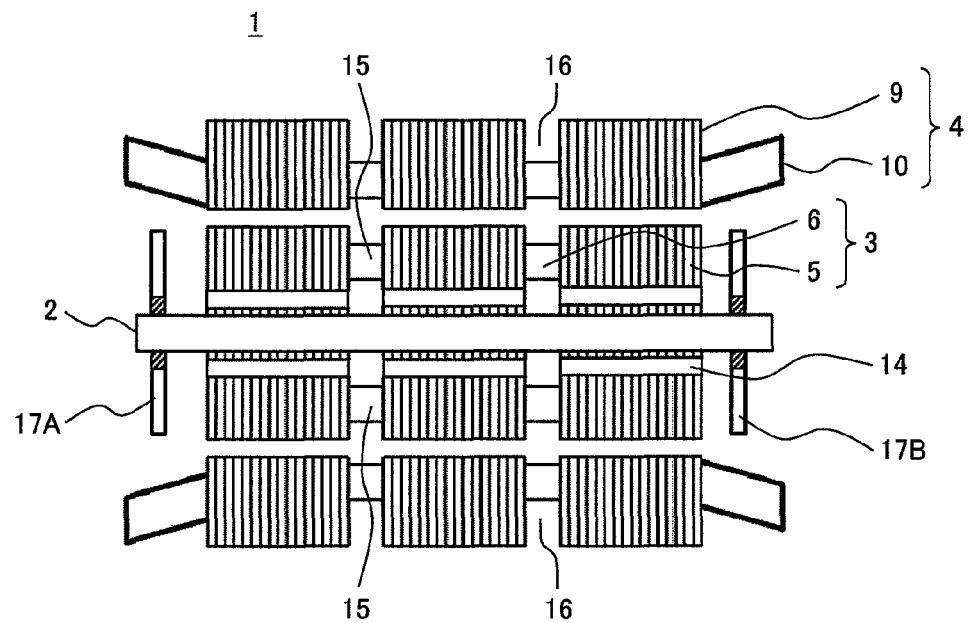
FIG. 14 is a view corresponding to FIG. 1 showing a sixth embodiment of permanent magnet type rotary electric machines according to the present invention.

Nextly, a sixth embodiment of the present invention will be explained with reference to FIG. 14, wherein, since ones bearing the same reference numerals as in the first embodiment show the same constitutional members as in the first embodiment, further detailed explanation thereof is omitted.

Figure 13:
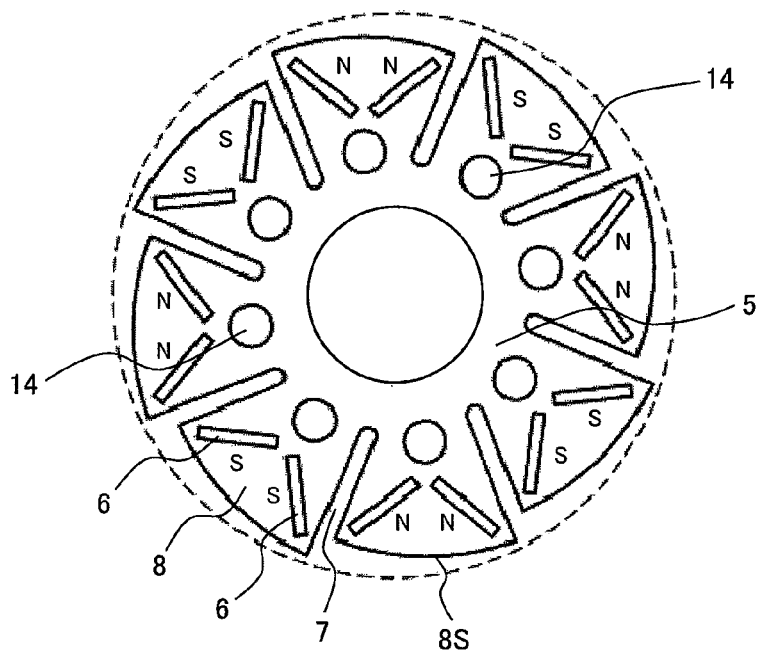
FIG. 13 is a view corresponding to FIG. 2 showing a fifth embodiment of permanent magnet type rotary electric machines according to the present invention.

In the present embodiment, constitutions different from that of the first embodiment are that the through holes 14 as shown in FIG. 13 serving as the axial direction cooling passages are formed at the inner diameter side of the rotor core 5, radial direction ventilation ducts 15 are formed in the rotor cores 5 at a plurality of portions in axial direction when forming the same by laminating electromagnetic steel plates, like ventilation ducts 16 are formed in the stator core 9 and axial fans 17A and 17B positioned at both sides in axial direction of the rotor 3 are provided on the rotating shaft 2.

By constituting in such manner, since coolant is pressed in such as the cooling use ventilation grooves (not shown) 7 of the rotor core 5 and the through holes 14 by the axial fans 17A and 17B, from there the coolant flows in radial direction through the ventilation ducts 15, and further, from there the coolant passes the ventilation ducts 16 of the stator 4 and returns to the axial fans 17A and 17B, the cooling efficiency for such as the rotor 3 and stator 4 can be enhanced, which further contributes to reduce size and increase capacity of the permanent magnet type generator 1.

Figure 15:
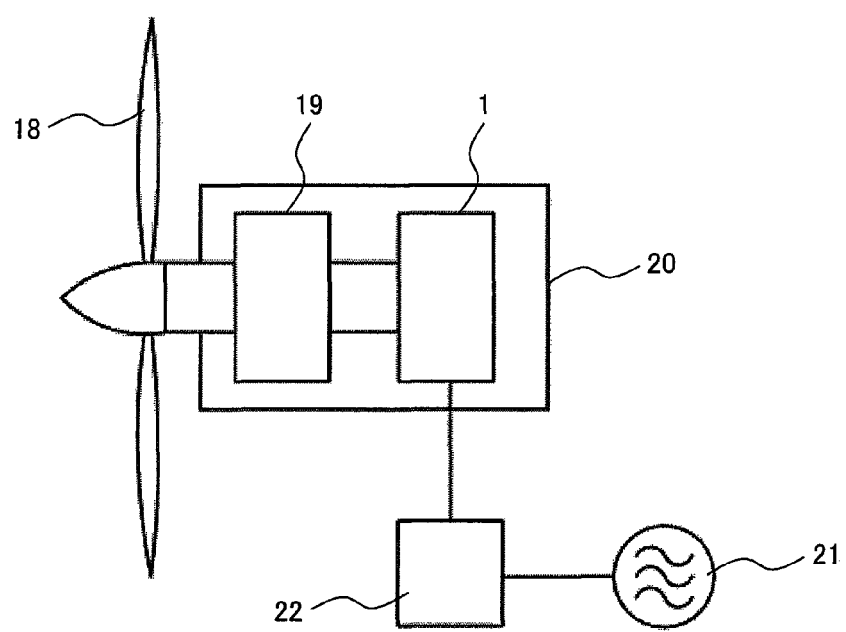
FIG. 15 is a schematic diagram showing a wind power generation system in which a permanent magnet type generator according to the present invention is applied.

Further, FIG. 15 shows an example in which any of the permanent magnet type generators 1 according to the respective embodiments is applied to a wind power generation system.

A permanent magnet type generator 1 is rotatably connected to a windmill 18 serving as a prime mover via a speed reduction means 19. The permanent magnet type generator 1 and the speed reduction means 19 are disposed inside a windmill nacelle 20. Then, the permanent magnet type generator 1 is electrically connected to a load 21 via a power converter 22, and performs power generating operation.

Further, although the permanent magnet type generator 1 is rotatably connected to the windmill 18 via the speed reduction means 19, the same can be directly connected to the windmill 18.

In the above manner, when the small sized and large capacity permanent magnet type generator 1 according to the present invention is applied for the wind power generation system, the size of the total windmill nacelle 20 can be reduced.

Now, in the explanation hitherto, since the air gap from the stator to a corresponding position on the outer circumference of a magnetic pole representing the top end side in the rotating direction thereof is gradually decreased along the circular arc of the outer circumference of the magnetic pole with respect to a gap from the stator to a corresponding position on the outer circumference of the magnetic pole representing the side in the anti rotating direction, the magnetic flux concentration to the down end side of the magnetic pole is smoothly distributed and reduced. However, if the air gap from the stator is varied by slanting the outer circumference of the magnetic pole linearly, the magnetic fluxes are likely concentrated contrarily to the most close air gap portion to the stator, the magnetic flux concentration reduction effect cannot be achieved. Accordingly, the air gap from the stator is required to gradually decrease along the circular arc of the outer circumference of the magnetic pole.

Further, when forming the outer circumference of the magnetic pole in a circular arc, although an example is shown in which the circular arc is formed with reference to a single radius center, the circular arc of the outer circumference of the magnetic pole can be formed with reference to a plurality of radius centers depending on such as use and characteristic of the permanent magnet type generator.

In addition, in view of such as assembling ease of the permanent magnets, permanent magnets divided in plural in the axial direction can be used.

INDUSTRIAL APPLICABILITY

In the respective embodiments, although the permanent magnet type generators applicable to wind power generation systems are explained, the permanent magnet type generators can also be used by coupling with such as a water turbine, engine and steam turbine serving as a prime mover.

Further, the permanent magnet type rotary electric machine according to the present invention can be also applied to a permanent magnet type motor. However, when using the permanent magnet type rotary electric machine as a permanent magnet type motor, it is important that the air gap from the stator to a corresponding position on the outer circumference of a magnetic pole representing the top end side in the rotating direction thereof is widened more than the gap from the stator to a corresponding position on the outer circumference of the magnetic pole representing the side in the anti rotating direction.

The invention claimed is:

1. A permanent magnet type rotary electric machine comprising:
    a stator; and
    a rotor that is born in free of rotation with respect to the stator via an air gap, and in which an even number of cooling use ventilation passages extending in axial direction are formed in a rotor core of the rotor along the circumferential direction with an interval, and an even number of magnetic poles constituted by burying permanent magnets in the rotor core between the adjacent cooling use ventilation passages along the circumferential direction, and the rotor is rotated in one direction,
    wherein the outer circumference of the respective magnetic poles of even number is formed in a circular arc, the circular arc of each of the respective magnetic poles having a same curvature, and a magnetic pole center axes of the respective magnetic poles are displaced with respect to the rotation center of the rotor so that the gap between the stator and the respective magnetic pole outer circumferences at the rear end side in the rotating direction is widened in comparison with the gap at the top end side.

2. A permanent magnet type rotary electric machine according to claim 1, wherein the circular arcs formed on the outer circumferences of the respective magnetic poles are respectively formed in an circular arc having a same radius.

3. A permanent magnet type rotary electric machine according to claim 1, wherein the circular arcs formed on the outer circumferences of the respective magnetic poles are respectively formed in an circular arc having a same radius, and the respective magnetic poles are formed by slanting its magnetic pole center axis toward one side in the rotating direction.

4. A permanent magnet type rotary electric machine according to claim 1, wherein the circular arcs formed on the outer circumferences of the respective magnetic poles are respectively formed in an circular arc having a same radius, and the respective magnetic poles are formed by displacing its magnetic pole center axis toward one side in the rotating direction in parallel with respect to the center line passing the rotating center of the rotor.

5. A permanent magnet type rotary electric machine according to claim 1, wherein the circular arcs formed on the outer circumferences of the respective magnetic poles are respectively formed in an circular arc having a plurality of radii.

6. A permanent magnet type rotary electric machine according to claim 1, wherein the circular arcs formed on the outer circumferences of the respective magnetic poles are respectively formed in an circular arc having a plurality of radii, and the respective magnetic poles are formed by slanting its magnetic pole center axis toward one side in the rotating direction.

7. A permanent magnet type rotary electric machine according to claim 1, wherein the circular arcs formed on the outer circumferences of the respective magnetic poles are respectively formed in an circular arc having a plurality of radii, and the respective magnetic poles are formed by displacing its magnetic pole center axis toward one side in the rotating direction in parallel with respect to the center line passing the rotating center of the rotor.

8. A permanent magnet type rotary electric machine according to claim 1, wherein axial direction cooling passages are formed at the inner diameter side from the portions where the permanent magnets are buried in the rotor core and in parallel with the cooling use ventilation grooves.

9. A permanent magnet type rotary electric machine according to claim 1, wherein radial direction ducts are formed in the rotor core at a plurality of portions in axial direction.

10. A permanent magnet type rotary electric machine according to claim 1, wherein axial direction cooling passages are formed at the inner diameter side from the portions where the permanent magnets are buried in the rotor core and in parallel with the cooling use ventilation grooves as well as radial direction ventilation ducts that communicate with the axial direction ventilation passages are formed in the rotor core at a plurality of portions in axial direction.

11. A permanent magnet type rotary electric machine according to claim 1, wherein in each of the magnetic poles of the rotor two permanent magnets of flat plate having a rectangular cross section are disposed in parallel in circumferential direction with an interval.

12. A permanent magnet type rotary electric machine according to claim 1, wherein in each of the magnetic poles of the rotor two permanent magnets of flat plate of a circular arc shaped cross section are disposed in parallel in circumferential direction with an interval.

13. A permanent magnet type rotary electric machine according to claim 11, wherein the flat plate permanent magnet is divided in axial direction.

14. A wind power generation system, wherein the system uses a permanent magnet type rotary electric machine according to claim 1 as a generator, wherein the permanent magnet type generator is disposed inside a windmill nacelle, is connected rolatably to a windmill and electronically connected to a load via a power converter.

* * * * *